UNITED STATES PATENT OFFICE.

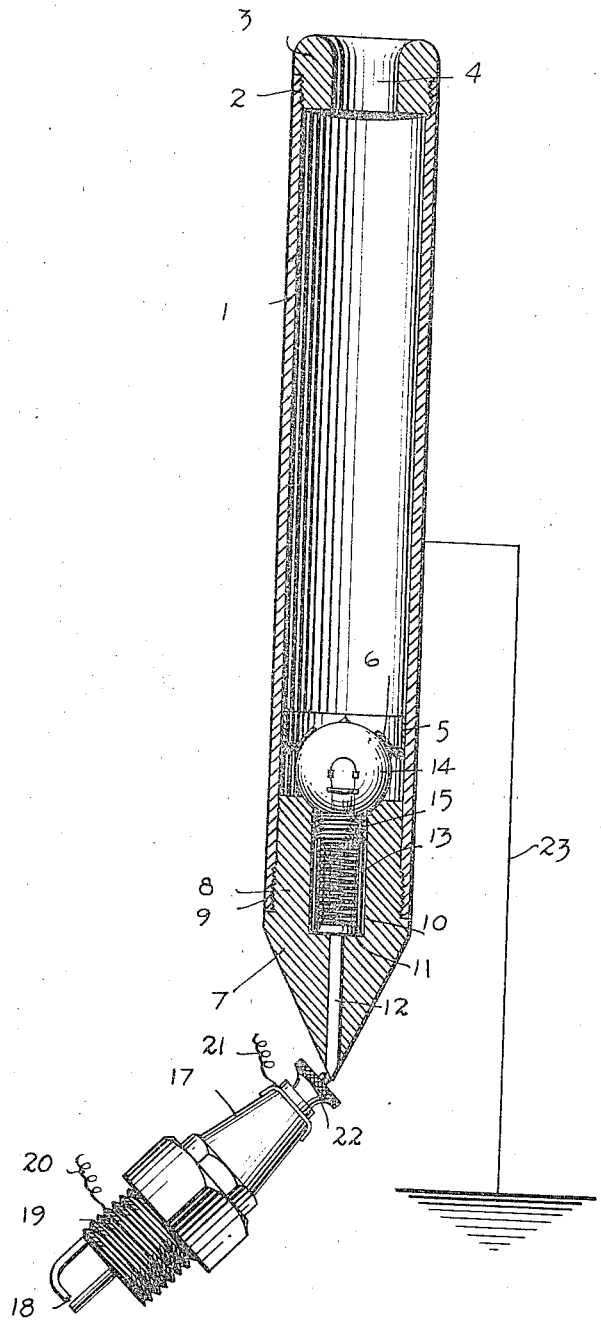

ADDISON R. LAMBERSON, OF ALBANY, NEW YORK.

INDICATOR FOR SPARK-PLUGS.

995,878.

Specification of Letters Patent.  Patented June 20, 1911.

Application filed December 1, 1910. Serial No. 595,023.

*To all whom it may concern:*

Be it known that I, ADDISON R. LAMBERSON, a citizen of the United States, and a resident of Albany, in the county of Albany and State of New York, have invented a new and Improved Indicator for Spark-Plugs, of which the following is a full, clear, and exact description.

My invention relates to indicators for spark plugs, my more particular purpose being to provide an indicator having generally the form of a testing tube into which the operator may look in order to ascertain the electrical condition of a spark plug to which the indicator is applied.

More particularly stated, my invention comprehends a tube provided with a peep-hole and containing a vacuum bulb and provided with electrical connections whereby a brush discharge is caused to take place in the vacuum bulb, the latter becoming luminous and thereby visible through the peep-hole to the operator. In this connection I call attention to a few facts well known in relation to the operating and testing of spark plugs used in connection with internal combustion engines. The spark plug is ordinarily constructed, but provided with a spark gap which is normally open—that is to say, comprises two terminals which are ordinarily separated by an air gap. If, now, it happens that for any reason a quantity of material of practically any kind gets into the spark gap, a short connection is almost invariably made. This is true even if the gap be bridged by a volume of lubricating oil, as this oil is apt to contain either particles of carbon, small particles of metal, or impurities of other kinds in the form of dust. Where a spark plug is in perfect condition there is no short connection across the gap, and consequently the potential of the portion of the plug in connection with the source of electric supply is raised considerably each time current is supplied to the plug. If, on the other hand, owing to the fouling of the plug—that is, owing to the formation of a short connection in the spark gap as above described—it happens that there is a short connection established across the gap and current is supplied to the plug as usual, the potential of the plug or of any portion thereof is not raised to a very great extent. When high tension currents are employed, as is generally the case, the potential is, of course, very high when the plug is in perfect condition, and is comparatively low when the plug is operating badly, or, at least, when the plug is fouled as above described.

What I seek to do is to provide an indicator having generally the form of a tube which may be carried in the pocket or disposed upon any convenient part of a vehicle and used from time to time by applying a portion of it directly to the binding post of a spark plug, the operator looking into the end of the tube and ascertaining whether or not the spark plug is in good condition, the indication being made by the glow of a vacuum lamp contained within the tube.

Reference is to be had to the accompanying drawing forming a part of this specification, in which the figure shows a cross section through my indicator as momentarily applied to a spark plug.

A piece of steel tubing 1 is threaded internally at 2 and fitted into this end of the tube is a ring 3 of wood. This ring is provided with an opening 4 which, because of its nature, I designate as a "peep-hole." Mounted within the tube 1 is a contact washer 5 provided with an inwardly projecting annular flange 6. This contact washer, including its portion 6, is made of metal. At 7 is a conical head made of insulating material and provided with a threaded portion which mates a threaded portion 9 of the tube 1, so that the conical head 7 may be detachably connected with the tube. The conical head is provided with a cylindrical passage 10 and fitted into the latter is a head 11. A pin 12 is connected with this head and is provided with a point which serves practically as the point of the conical head 7. A spiral spring 13 is disposed within the passage 10 and engages the head 11.

At 14 is a vacuum bulb, or, popularly speaking, a small incandescent lamp, having the usual inside and outside terminals, the outside terminal being shown at 15 and being threaded as usual. The filament of the lamp is shown at 16 and is in metallic communication with both terminals. The spring 13 engages the terminal 15, although if desired the diameter of the spring 13 may be reduced and the spring may make engagement with the inside terminal only.

At 17 is a spark plug which is provided with a spark gap 18 and with a threaded portion 19 whereby it is detachably mounted upon the engine. The return conductor is shown at 20 and may be in part, at least, the framework of the engine. At 21 is a connecting wire for feeding high tension currents to the spark plug. To facilitate the connection of this wire 21 with the spark plug 17, I provide a binding post 22 which may be of the usual type. When the spark plug is in action, if the spark gap 18 is clear and the plug otherwise is in good working condition, the potential of the binding post 22 and portions of the plug immediately adjacent to the same is raised considerably every time a high tension current is supplied through the wire 21. When, however, the spark gap 18 is fouled so that the high tension current escapes easily across it, the potential of the binding post 22 is raised but little if any.

The operator, in order to test the condition of the spark plug, and particularly of the spark gap 18, takes the tube in his hand and applies the point of the pin 12 to the binding post 22. The body of the operator handling the device above described serves in a measure as a conductor, and in the drawing this conductor is represented diagrammatically at 23.

The operation of my device is as follows: Assume that the operator wishes to ascertain the condition of the spark gap 18 and has applied the tube as above described, so that the point of the pin 12 engages the binding post 22. If, now, it happens that the spark gap 18 is fouled so that the high tension currents pass readily across this gap, and consequently the potential of the binding post 22 is not raised to any great extent, little or no current can flow through the pin 12 and parts connected electrically therewith. The operator now looks through the peep-hole 4, and seeing no illumination within the tube, knows that the spark gap 18 is fouled, or at least that there is something wrong with the spark plug. Suppose, however, that the spark gap 18 is in good condition. The potential of the binding post 22 rises very high whenever a supply of high tension current is sent through the wire 21 to the binding post 22. The operator holding the tube 1 in his hand and standing upon the ground or upon a floor affording an easy path for a discharge of high tension current, causes the current to flow. The passage of the current is as follows: Wire 21, binding post 22, pin 12, head 11, spring 13, terminal 15, to filament 16, thence through the rarefied air or other gas within the vacuum bulb 14 and through the glass bulb to the portion 6 of the contact washer 5, thence through the substance of the tube 1 to the operator's body (represented diagrammatically by the conductor 23), to floor or ground, thence to source of supply, and finally back to the wire 21. The passage of the current from the filament 16 through the vacuum to the metallic flange 6 causes the lamp to become illuminated, the nature of the discharge through it being a so-called "brush discharge," the illuminating of which is greatly improved by the fact that the lamp contains a so-called vacuum. The effect is somewhat upon the order of that produced in a Geissler tube. The operator now looking through the peep-hole 4, observes within the tube the glow made by the lamp 14, and noting the perfection of the glow is able thereby to ascertain that the plug is in good condition. If the spark gap 18 be only partially fouled, a partial glow of the lamp gives a quantitative indication, thereby enabling the operator to ascertain, roughly at least, the degree of disability under which the spark gap is acting. The operator in practice merely picks up a tube and touching its point successively to the different binding posts representing the several spark plugs, glances through the peep-hole 4 in each instance as he applies the tube, and in this manner detects, practically in an instant, any one or more of the spark plugs in which the spark gap is fouled.

I do not limit myself to any particular materials to be employed in the construction of this device. Neither am I limited to any special shape for the vacuum lamp, nor to any particular kind of rarefied gas or vapor which it may contain. Neither do I limit myself to the particular arrangement of the several parts herein shown, the scope of my invention being commensurate with my claims. While in this instance I have shown the pin 12 as engaging the binding post of a spark plug, it should be understood that any other suitable contact member of terminal can be employed instead of the pin 12, and that for purposes of testing the pin, it can be brought into contact with any sort of conductor, the current of which is to be tested.

Having thus described my invention, I claim as new and desire to secure by Letters Patent:

1. The combination of a metallic tubular member, a head closing one end of said tubular member and made of insulating material, a metallic member mounted within said head and provided with a portion to be applied to a conductor, a spring mounted within said head and in electrical communication with said metallic tubular member, a lamp disposed within said tubular member and engaging said spring, and a contact washer connected with said tubular member and engaging a part of said lamp.

2. The combination of a tubular metallic member, a contact washer mounted therein, a lamp bulb disposed within said tubular member and provided with a vacuum globe engaging said contact washer, said lamp being further provided with a conducting member from which a discharge may take place to said contact washer, and electrical connections, one of said electrical connections being provided with a portion extending from said tubular member and adapted to be applied to a conductor.

3. The combination of a tubular metallic member, a contact washer mounted therein, a lamp bulb disposed within said tubular member and provided with a vacuum globe engaging said contact washer, said lamp being further provided with a conducting member from which a discharge may take place to said contact washer, electrical connections, one of said electrical connections being provided with a portion extending from said tubular member and adapted to be applied to a conductor, and an annular member fitted into one end of said tubular member and provided with a peep-hole for enabling the operator to observe said lamp.

In testimony whereof I have signed my name to this specification in the presence of two subscribing witnesses.

ADDISON R. LAMBERSON.

Witnesses:
FREDK. E. WADHAMS,
A. MARY KRETSCHMER.